United States Patent
Soto Ruvalcaba et al.

(10) Patent No.: US 10,224,702 B1
(45) Date of Patent: Mar. 5, 2019

(54) SYSTEM FOR A FLEXIBLE BUS DUCT AND BUS BAR

(71) Applicant: General Electric Company, Schenectady, NY (US)

(72) Inventors: Esmeralda Soto Ruvalcaba, Queretaro (MX); Josafat Olvera George, Queretaro (MX); Randall Kleen, Channelview, TX (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 15/827,665

(22) Filed: Nov. 30, 2017

(51) Int. Cl.
*H01R 4/60* (2006.01)
*H02G 5/00* (2006.01)
*H02G 5/08* (2006.01)
*H02B 1/21* (2006.01)

(52) U.S. Cl.
CPC ............ *H02G 5/002* (2013.01); *H02G 5/007* (2013.01); *H02G 5/08* (2013.01); *H02B 1/21* (2013.01); *H02G 5/005* (2013.01)

(58) Field of Classification Search
CPC .......... H02G 5/002; H02G 5/005; H02G 5/08; H02G 5/007; H02B 1/21; H01G 4/228
See application file for complete search history.

(56) References Cited

U.S. PATENT DOCUMENTS

| | | | |
|---|---|---|---|
| 3,462,541 A | 8/1969 | Davis et al. | |
| 4,008,365 A * | 2/1977 | Carlson | H02G 5/007 174/68.2 |
| 5,821,464 A * | 10/1998 | Graham | H02G 5/007 174/86 |
| 8,540,526 B2 * | 9/2013 | Mooney | H02G 5/007 174/86 |
| 9,071,028 B2 * | 6/2015 | Falk | H01G 4/228 |
| 9,882,366 B2 * | 1/2018 | Maurer | H02G 5/007 |
| 2008/0033435 A1 * | 2/2008 | Studer | A61B 17/7028 606/256 |

FOREIGN PATENT DOCUMENTS

| | | |
|---|---|---|
| CN | 204304351 U | 4/2015 |
| WO | 2011119018 A2 | 9/2011 |

* cited by examiner

Primary Examiner — Jean F Duverne
(74) Attorney, Agent, or Firm — Fletcher Yoder P.C.

(57) ABSTRACT

A system includes a bus duct that includes a first end, a second end, and a duct body extending between the first end and the second end. The duct body include a flexible bus duct section, and the duct body forms an interior cavity. The system also includes a bus bar disposed within the interior cavity of the bus duct. The bus bar includes a first rigid section, a second rigid section, and a flexible section disposed between the first rigid section and the second rigid section. The flexible section of the bus bar includes a conductive braid, and the flexible bus duct section and the flexible section of the bus bar are configured to translate along at least one of a longitudinal axis, a lateral axis, and a vertical axis.

20 Claims, 5 Drawing Sheets

SYSTEM FOR A FLEXIBLE BUS DUCT AND BUS BAR

BACKGROUND

The subject matter disclosed herein relates to a system for a flexible bus duct.

Industrial machines may provide for the generation and transfer of power. For example, a generator may transform mechanical energy or heat energy into electricity. The electricity produced by the generator may be utilized to provide power to machines. In some systems the electricity produced by the generator may travel through a circuit breaker system before travelling to the machines. A bus bar may be utilized to carry the electricity from the generator to the circuit breaker system. Further, a bus duct may surround the bus bar to provide a barrier between the bus bar and its surroundings. In varying systems, a distance and arrangement between the generator and circuit breaker may differ. Accordingly, a length of the bus bar and bus duct may differ in varying systems. It may be beneficial to provide a bus bar and bus duct having a variable length.

BRIEF DESCRIPTION

Certain embodiments commensurate in scope with the originally claimed subject matter are summarized below. These embodiments are not intended to limit the scope of the claimed subject matter, but rather these embodiments are intended only to provide a brief summary of possible forms of the subject matter. Indeed, the subject matter may encompass a variety of forms that may be similar to or different from the embodiments set forth below.

In a first embodiment, a system includes a bus duct that includes a first end, a second end, and a duct body extending between the first end and the second end. The duct body include a flexible bus duct section, and the duct body forms an interior cavity. The system also includes a bus bar disposed within the interior cavity of the bus duct. The bus bar includes a first rigid section, a second rigid section, and a flexible section disposed between the first rigid section and the second rigid section. The flexible section of the bus bar includes a conductive braid, and the flexible bus duct section and the flexible section of the bus bar are configured to translate along at least one of a longitudinal axis, a lateral axis, and a vertical axis. Further, the bus bar is configured to transfer electricity from the first rigid section to the second rigid section, and the bus duct is configured to isolate the bus bar from an external environment.

In a second embodiment, a system includes a bus duct that includes a first end, a second end, and a duct body extending between the first end and the second end. The duct body includes a flexible bus duct section, and the duct body forms an interior cavity. The system also includes multiple bus bars disposed within the interior cavity of the bus duct, and each of the multiple bus bars includes a first rigid section, a second rigid section, and a flexible section disposed between the first rigid section and the second rigid section. Further, the flexible section of each of the multiple bus bars includes a conductive braid, and the flexible bus duct section and the flexible section of each of the multiple bus bars are configured to translate along at least one of a longitudinal axis, a lateral axis, and a vertical axis. Moreover, each of the multiple bus bars is configured to transfer electricity from the first rigid section to the second rigid section, and the bus duct is configured to isolate the plurality of bus bars from an external environment.

In a third embodiment, a system includes a bus duct that includes a first end, a second end, and a duct body extending between the first end and the second end. Further, the duct body includes a flexible bus duct section, and the duct body forms an interior cavity. In addition, the flexible bus duct section is configured to translate to dispose the second end at a first position along a connection axis a first distance from the first end. Moreover, the flexible bus duct section is configured to translate to dispose the second end at a second position a second distance from the first end, and the first distance is different than the second distance, and the second position is offset from the connection axis. The system also includes at least one bus bar disposed within the interior cavity of the bus duct, and the at least one bus bar includes a first rigid section, a second rigid section, and a flexible section disposed between the first rigid section and the second rigid section. Further, the flexible section of the at least one bus bar includes a conductive braid, and the flexible bus duct section and the flexible section of the at least one bus bar are configured to translate along at least one of a longitudinal axis, a lateral axis, and a vertical axis. In addition, the at least one bus bar is configured to transfer electricity from the first rigid section to the second rigid section, and the bus duct is configured to isolate the at least one bus bar from an external environment. Moreover, the system includes a generator coupled to the first end of the bus duct. The system also includes a circuit breaker system coupled to the second end of the bus duct, and the at least one bus bar is configured to transfer electricity from the generator to the circuit breaker system.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present subject matter will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

Industrial machines may include a power generator (e.g., an internal combustion engine, a steam engine, a gas turbine, etc.) that produces electricity, which may be utilized to power components. Such industrial machines may use bus ducts and bus bars to carry the electricity from the power generator to other components (e.g., circuit breakers). In different industrial machines, the power generator and other components may be in different locations relative to one another. Accordingly, bus ducts and bus bars are utilized to transfer electricity from the power generator to the other components may have different dimensions. Discussed herein is a flexible bus duct and flexible bus bar that may translate along one or more axes to enable a single bus duct and bus bar that may adjust to different dimensions. A single bus duct and bus bar that may adjust to different dimensions may reduce manufacturing requirements, reduce the amount of disparate components necessary to fulfill orders, reduce the time to fulfill order, or any combination thereof.

Figure 1:
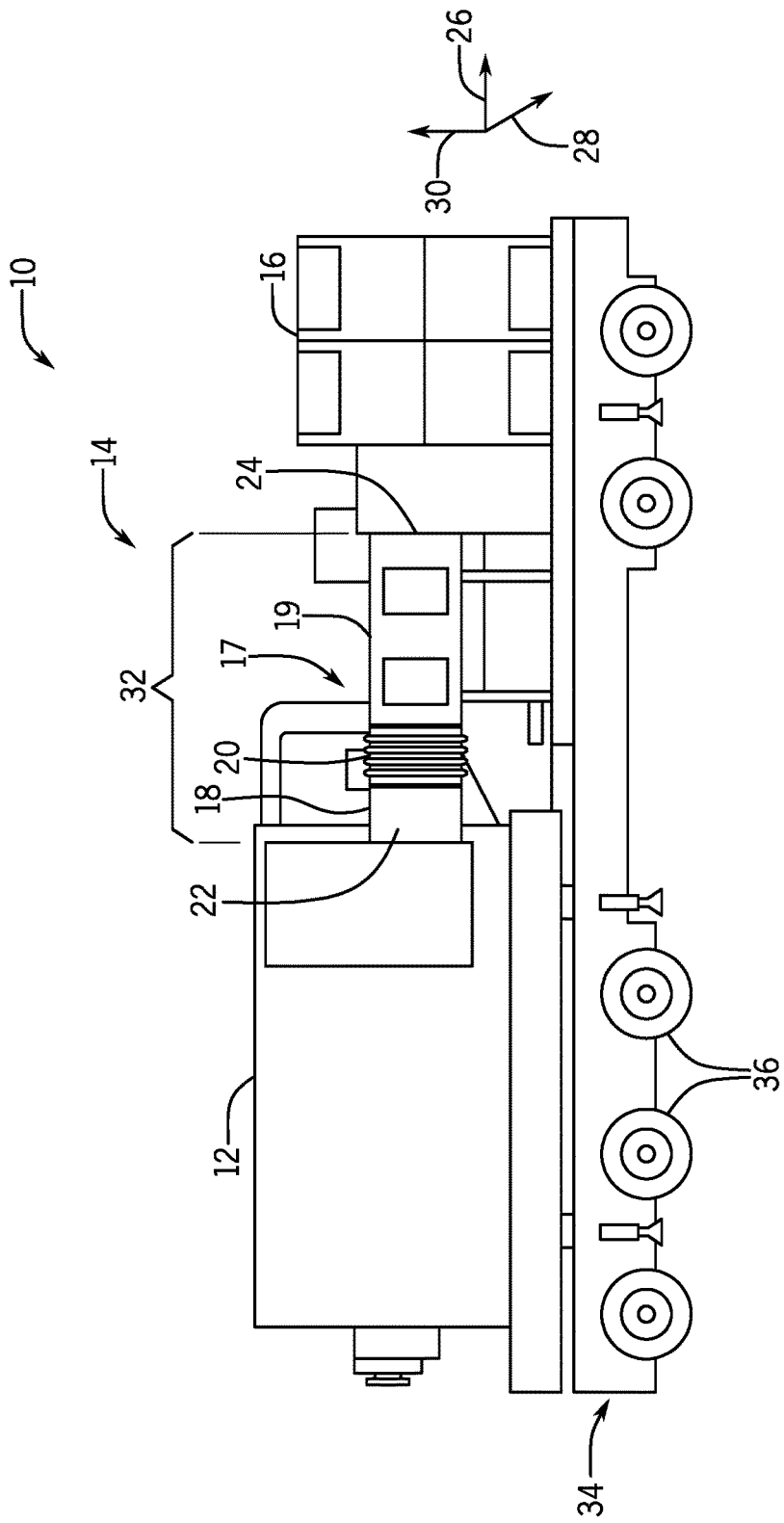
FIG. 1 is an embodiment of a power system having a power transfer system.

FIG. 1 is a perspective view of an embodiment of a power system 10 with a power generator 12, a power transfer system 14, and a circuit breaker system 16 (e.g., switchgear). The power generator 12 (e.g., an internal combustion engine, a steam engine, a gas turbine, etc.) produces electricity that may be utilized by various systems (e.g., industrial machines, lighting systems, HVAC systems, etc.). In some embodiments, the power generator 12 may include an engine that produces mechanical energy that is converted to electricity. The electricity produced by the power generator 12 may then be transferred through the power transfer system 14 to the circuit breaker system 16. The circuit breaker system 16 may include one or more circuit breakers that stop the electricity from flowing downstream from the circuit breaker system 16 under certain conditions. For example, if a current or voltage of the electricity supplied through the circuit breaker system 16 is above a threshold value, a circuit breaker of the circuit breaker system 16 may trip, thereby blocking the flow of the electricity. Blocking the flow of electricity may provide protection for electrical components electrically downstream of the circuit breaker system 16. In the present embodiment, the power system 10 is arranged on a mobile platform 34 (e.g., a truck trailer, a train car, etc.) having wheels 36 that enable the power system 10 to easily move from one location to another.

The power transfer system 14 utilizes bus bars contained within bus ducts to transfer the flow of electricity. For example, the power transfer system 14 may be electrically coupled to the power generator 12 at a first coupling section 22, and to the circuit breaker system 16 at a second coupling section 24. Further, the first coupling section 22 and the second coupling section 24 may couple to any suitable components, including other bus bars, transformers, power lines, etc. The power transfer system 14 may be utilized to transfer any suitable amount of electricity, including a low voltage such as 350 to 500 volts AC, a medium voltage such as 10,000 volts AC, 15,000 volts AC, 20,000 AC volts, 25,000 AC volts, 30,000 AC volts, 35,000 AC volts, or any other suitable voltage. For example, bus bars may transfer the electricity between the power generator 12 and the circuit breaker system 16, and the bus ducts may isolate the bus bars from the environment. In the present embodiment, the power transfer system 14 includes a bus duct 17 having a first rigid bus duct section 18, a second rigid bus duct section 19, and a flexible bus duct section 20. The flexible bus duct section 20 may translate along a longitudinal axis 26, a lateral axis 28, or a vertical axis 30, or any combination thereof.

The flexible bus duct section 20 may be utilized to enable the power transfer system 14 to couple to different configurations of the first coupling section 22 and the second coupling section 24. Among various configurations of the power system 10, a distance 32 between the power generator 12 and the circuit breaker system 16 may differ. For example, the distance 32 may be 5 inches, 10 inches, 15 inches, 20 inches, 25 inches, 30 inches, 35 inches, or more inches different between separate configurations. Further, in different configurations, the first coupling section 22 and the second coupling section 24 may be aligned differently, for example, along the longitudinal axis 26, the lateral axis 28, or the vertical axis 30, or any combination thereof. For example, the first coupling section 22 may have a different orientation relative the longitudinal axis 26 than the second coupling section 24, the second coupling section 24 may be offset from the longitudinal axis through the first coupling section 22, or any combination thereof. In the present embodiment, the first coupling section 22, and the second coupling section 24 are arranged along the longitudinal axis 26. In some configurations, the first coupling section 22, the second coupling section 24, or both may be arranged transverse to the longitudinal axis 26.

Figure 2:
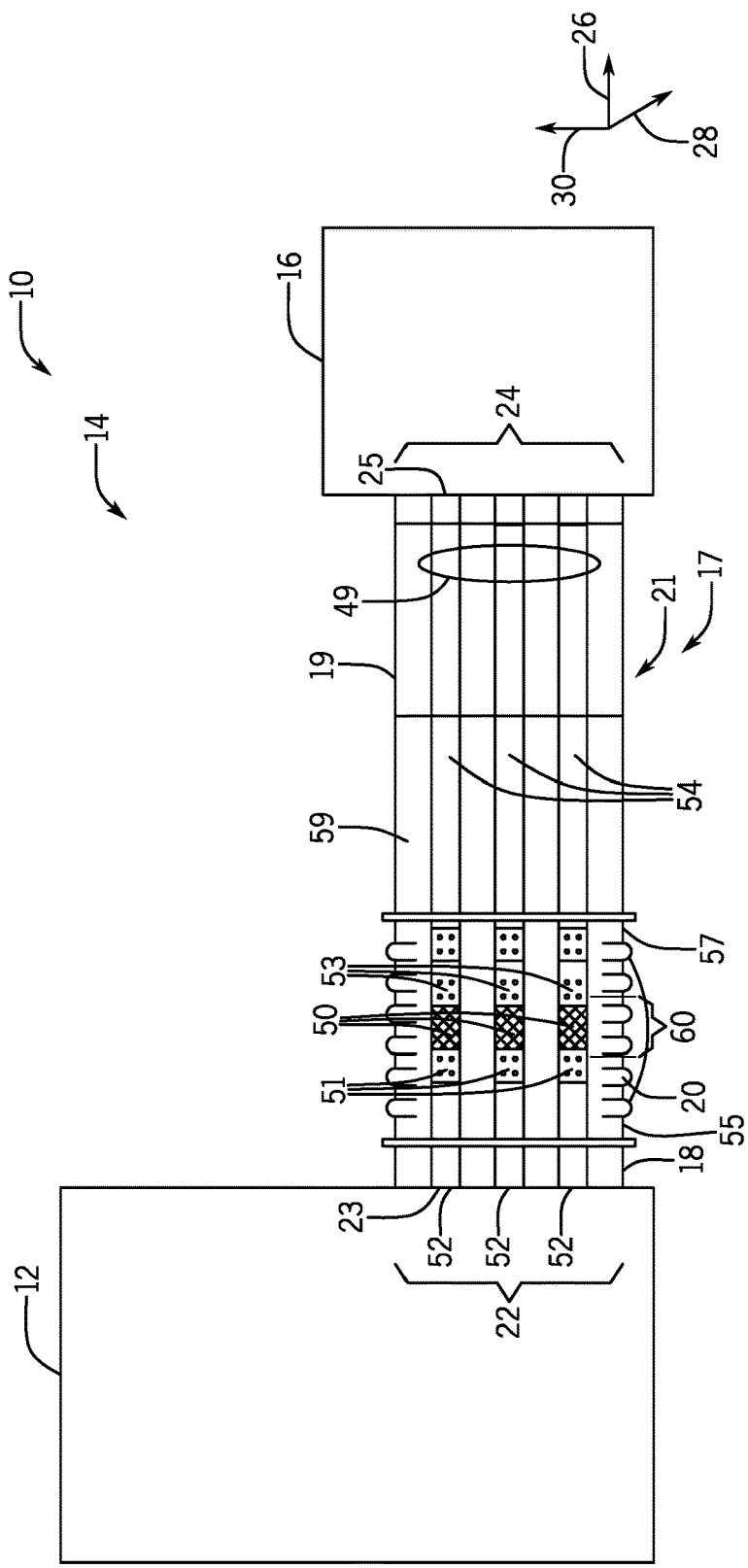
FIG. 2 is a top cross-sectional view of an embodiment of the power transfer system of FIG. 1 having a flexible bus duct with flexible bus bars contained within the flexible bus duct.

FIG. 2 is a top cross-sectional view of an embodiment of the power system 10 of FIG. 1 illustrating bus bars 49. Each bus bar 49 includes a flexible bus bar section 50, a first rigid bus bar section 52, and a second rigid bus bar section 54. Each of the flexible bus bar sections 50 are contained within the flexible bus duct section 20, the first rigid bus bar section 52 is contained within the first rigid bus duct section 18, and the second rigid bus bar section 54 is contained within the second rigid bus duct section 19. The rigid bus duct sections 18, 19 and the flexible bus duct section 20 form an interior cavity 59, through which the bus bars 50, 52, 54 extend. That is, a duct body 21 of the power transfer system 14 may include rigid bus duct sections 18, 19 and a flexible bus duct section 20. A first end 23 of the duct body may couple to the power generator 12, and a second end 25 of the duct body 21 may couple to the circuit breaker system 16.

Electricity is transferred from the power generator 12 to the first rigid bus bar section 52 of the power transfer system 14, then to the flexible bus bar section 50, and then to the second rigid bus bar section 54. The second rigid bus bar section 54 transfers electricity from the power transfer system 14 to the circuit breaker system 16. Accordingly, the flexible bus bar section 50, the first rigid bus bar section 52, and the second rigid bus bar section 54 may be composed of any suitable conductive material, including copper, brass, aluminum, etc. Further, the flexible bus bar section 50, the first rigid bus bar section 52, and the second rigid bus bar section 54 may also partially include (e.g., as a coating or wrap) non-conductive materials (e.g., polymers, rubber, etc.) that may insulate the conductive materials. Further, the rigid bus duct sections 18, 19 and the flexible bus duct section 20 may also be composed of any suitable conductive, non-conductive material (e.g., stainless steel, corrugated steel, polymers, rubber, etc.).

In some embodiments, the power transfer system 14 may be disposed in a corrosive environment, a hazardous environment, or both a corrosive and hazardous environment. Accordingly, the rigid bus duct sections 18, 19, the flexible bus duct section 20, the flexible bus bar section 50, the first rigid bus bar section 52, and the second rigid bus bar section 54 may be composed of materials suitable for highly corrosive and hazardous environments (e.g., explosive gas environments), and may comply with certain regulatory standards (e.g., IEC60079-15). In the present embodiment, the interior cavity 59 is not pressurized (e.g., there is no pressure difference between the interior cavity 59 and the ambient surroundings). In some embodiments, the interior cavity 59 may be pressurized (e.g., the pressure within the interior cavity 59 may be higher than the pressure in the ambient surroundings).

In the present embodiment, each of the flexible bus bar sections 50 has a first end 51 coupled (e.g., by bolts, screws, etc.) to one of the rigid bus bars of the first rigid bus bar section 52, and each of the flexible bus bar sections 50 has a second end 53, opposite of the first end 51, coupled to one of the rigid bus bars of the second rigid bus bar section 54. Further, the flexible bus duct section 20 is coupled (e.g., by bolts, screws, welds, etc.) to the first rigid bus duct section 18 at a first end 55, and the flexible bus duct section 20 is coupled to the second rigid bus duct section 18 at a second end 57. Accordingly, moving the rigid bus duct sections 18, 19 may cause the flexible bus duct section 20 to deform in the direction of movement of either of the rigid bus duct sections 18, 19.

Each of the flexible bus bar sections 50 includes a flexible portion 60 that enables the corresponding flexible bus bar section 50 to translate along the longitudinal axis 26, to rotate about the longitudinal axis 26, to translate along the lateral axis 28, to rotate about the lateral axis 28, to translate along the vertical axis 30, to rotate about the vertical axis 30, or any combination thereof. The flexible portion 60 may include a number of metal wires smaller than the rigid portions, and may be a conductive metal (e.g., copper, brass, aluminum, etc.). The metal wires may be interwoven (e.g., into a braid) that enables flexibility while maintaining conductive properties along the flexible bus bar section 50.

In the present embodiment, the flexible bus duct section 20 and each of the flexible bus bar sections 50 move in unison. For example, if the flexible bus duct section 20 translates along the lateral axis 28, the flexible bus bar sections 50 also translate along the lateral axis 28. In some embodiments, the flexible bus bar sections 50 and the flexible bus duct section 20 may move differently. For example, if the flexible bus duct section 20 translates along the lateral axis 28, the flexible bus bar sections 50 may translate along the longitudinal axis 26, the lateral axis 28, the vertical axis 30, or any combination thereof. In some embodiments, the flexible bus bar sections 50 may rotate about the lateral axis 28 the flexible bus bar sections 50 may translate along the longitudinal axis 26, the lateral axis 28, the vertical axis 30, or any combination thereof, which may cause the flexible bus bar sections 50 to deflect varying lengths.

In the present embodiment, three bus bars 49 are utilized. In some embodiments, any number of bus bars 49 may be utilized, including 1, 2, 4, 5, 6, or more. Further, in the present embodiment, the bus duct 17 includes one flexible bus duct section 20. In some embodiments, the bus duct 17 may include any number of flexible bus duct sections 20, including 2, 3, 4, 5, 6, or more. Utilizing more than one flexible bus duct section may enable the power transfer system 14 to extend around obstacles disposed between the power generator 12 and the circuit breaker system 16. It may be appreciated that some embodiments of the power transfer system 14 may include multiple flexible bus duct sections 20 and corresponding flexible bus bar sections 50, thereby enabling multiple changes of direction of the bus duct along its length from the first end 23 to the second end 25. Each flexible bus duct section 20 may be coupled between rigid bus duct sections 18, 19, and each flexible bus bar section 50 may be coupled between rigid bus bar sections 52, 54.

Figure 3:
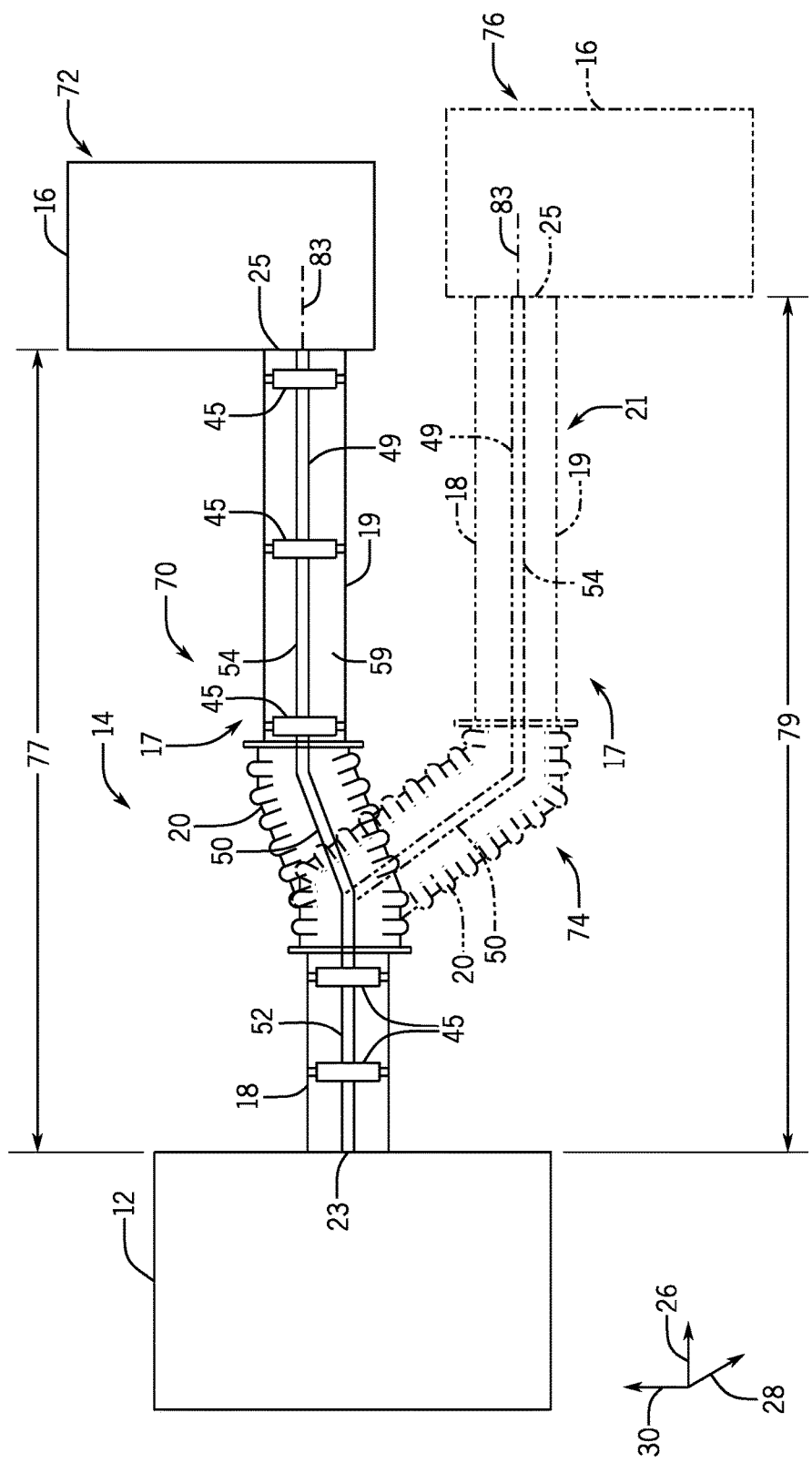
FIG. 3 is a top cross-sectional view of the power transfer system of FIG. 1 translated in a first configuration to couple to a circuit breaker system located in a first position, and the power transfer system of FIG. 1 translated in a second configuration to couple to the circuit breaker system located in a second position.

FIG. 3 is a cross-sectional view of the power transfer system 14 translated in a first configuration 70 to couple to the circuit breaker system 16 located in a first position 72, or the same power transfer system 14 translated in a second configuration 74 to couple to the circuit breaker system 16 located in a second position 76. As discussed above, the power generator 12 and the circuit breaker system 16 may change positions relative to one another among various configurations of the power system 10. In some embodiments, the power system 10 may have different space constraints in different applications. For example, the power system 10 may be utilized on mobile platforms having different sizes. Accordingly, the circuit breaker system 16 may be located in the first position 72 in a first embodiment and in the second position 76 in a second embodiment.

As depicted, the second position 76 may be offset along the longitudinal axis 26, the lateral axis 28, the vertical axis 30, or any combination thereof with respect to the first position 72. Further, a first distance 77 between the first end 23 and the second end 25 may have a first length in the first position 72, and a second distance 79 between the first end 23 and the second end 25 may have a second length in the second position 76. The first distance 77 and the second distance 79 may be different from one another. In the present embodiment, the first distance 77 and the second distance 79 are relative to the longitudinal axis 26. In some embodiments, the first distance 77 and the second distance 79 may be relative to the lateral axis 28 or the vertical axis 30. Further, while in the first position 72, the second end 25 of the duct body 17 is coupled to the circuit breaker system 16 along a first connection axis 83. While in the second position 76, the second end 25 of the duct body 17 is coupled to the circuit breaker system 16 along a second connection axis 85, and the first connection axis 83 is offset from the second connection axis 85. In some embodiments, the first connection axis 83 may be offset from the second connection axis 85 along the longitudinal axis 26, the lateral axis 28, the vertical axis 30, or a combination thereof. As such, electricity flows along a different path from the power generator 12 to the circuit breaker system 16 for the first configuration 70 than with the second configuration 74.

The power transfer system 14 may enable electricity to flow along different paths from the power generator 12 to the circuit breaker system 16 by utilizing the flexible bus duct section 20 and flexible bus bar sections 50. For example, the flexible bus duct section 20 and the flexible bus bar sections 50 may translate to either the first configuration 70 or the second configuration 74 to enable electricity to flow to the circuit breaker system 16 disposed in either the first position 72 or the second position 76. While a translation along the longitudinal axis 26 is shown in FIG. 3, it should be appreciated that the power transfer system 14 may be adjusted (e.g., at a manufacturing facility, during maintenance, upon delivery, etc.) in any direction to any suitable configuration. Further, the manufacturer may adjust the power transfer system 14 to suit a particular customer's order, or a customer may adjust the power transfer system 14 to suit a particular configuration of the power system 10.

The power transfer system 14 may also include support members 45 that couple to the bus duct body 19 and the bus bars of the first rigid bus bar section 52, the second rigid bus bar section 54, the flexible bus bar section 50, or a combination thereof. The support members may provide structural support to the bus bars contained within the interior cavity 59. Further, the support members may act as spacers between adjacent bus bars within each section. Accordingly, the support members may be composed, at least partially (i.e., as a coating or wrap) of non-conductive materials (e.g., polymers, rubber, etc.).

Figure 4:
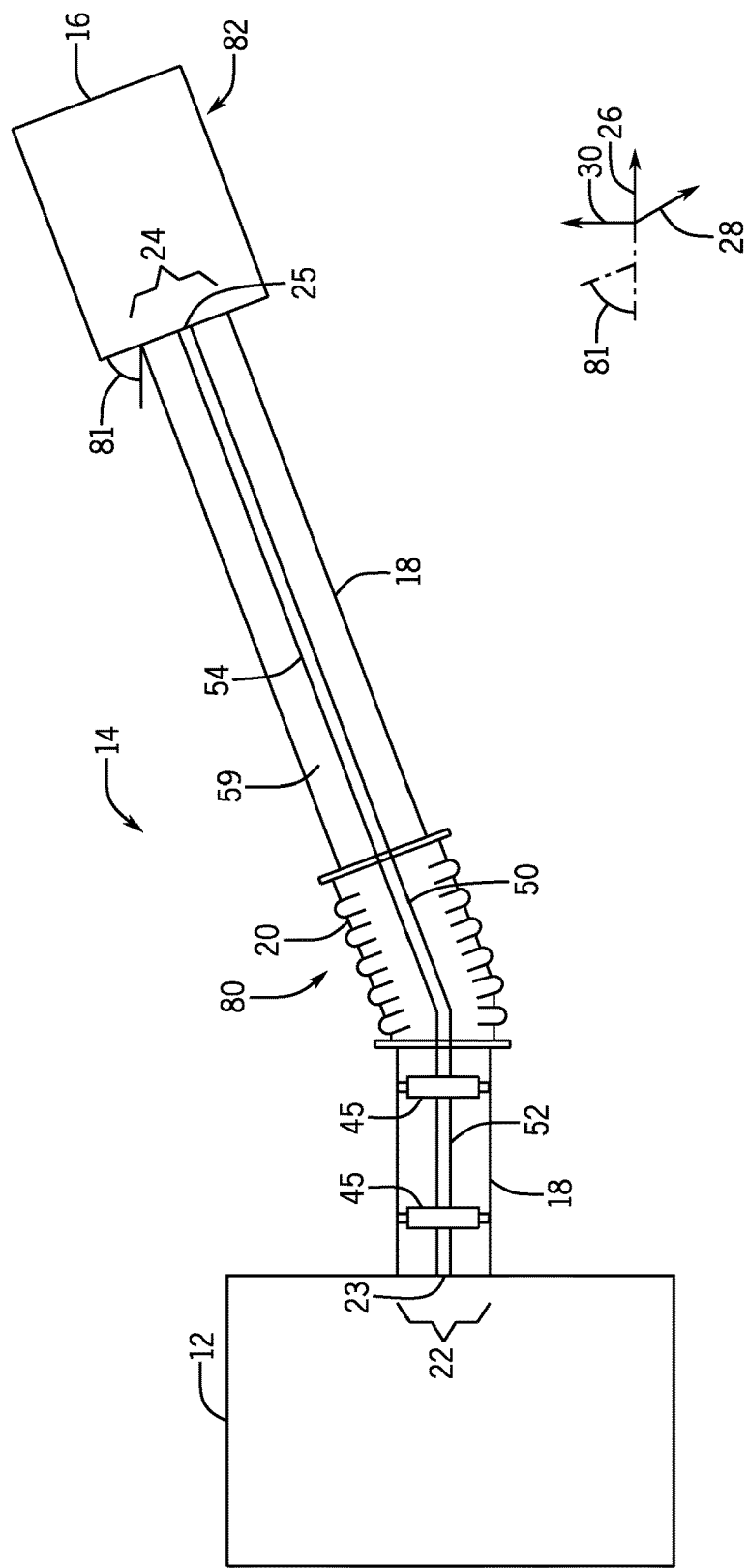
FIG. 4 is a top cross-sectional view of the power transfer system of FIG. 1 translated in a third configuration to couple to the circuit breaker system located in a third position 82.

FIG. 4 is a cross-sectional view of the power transfer system 14 translated in a third configuration to couple to the circuit breaker system 16 located in a third position 82. In some embodiments, the first coupling section 22 and the second coupling section 24 may be transverse to one another at an angle 81. The angle 81 may include any suitable angle, including 15 degrees, 30 degrees, 45 degrees, 60 degrees, 75 degrees, 90 degrees, 105 degrees, 120 degrees, 135 degrees, 150 degrees, 165 degrees, 180 degrees, or more degrees. Accordingly, the power transfer system 14 may be in the third configuration 80 that enables the power transfer system 14 to couple to the power generator 12 and the circuit breaker system 16 when the power generator 12 and the circuit breaker system 16 are not longitudinally aligned with one another. As discussed above, the flexible bus duct section 20 and the flexible bus bars 50 may translate any suitable distance, such as 0.25 inches, 0.5 inches, 0.75 inches, 1 inch, 2 inches, 3 inches, 4 inches, 5 inches, 7 inches, 10 inches, 15 inches, 20 inches, or more inches in any suitable direction. Accordingly, the flexible bus duct section 20 and the flexible bus bar sections 50 may be utilized to enable the power transfer system 14 to couple to the power generator 12 and the circuit breaker system 16 regardless of the relative positions of the power generator 12 and the circuit breaker system 16.

Figure 5:
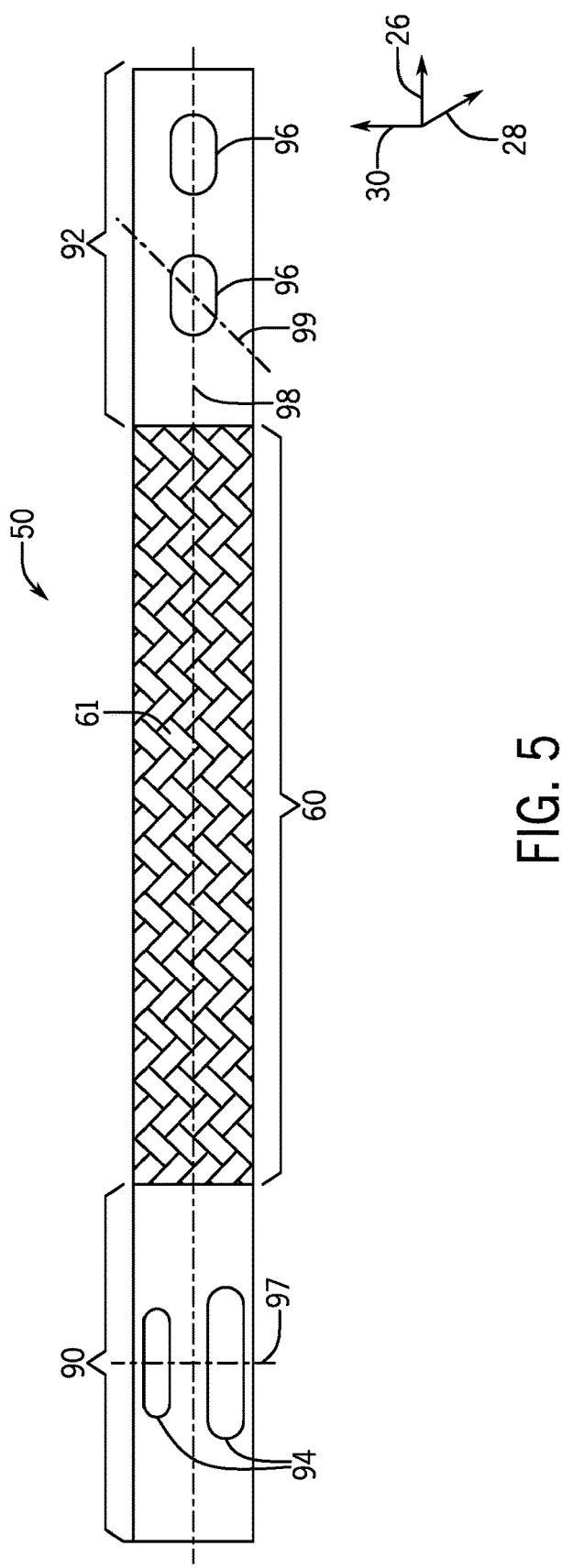
FIG. 5 is an embodiment of the flexible bus bar of FIG. 2.

FIG. 5 is an embodiment of the flexible bus bar section 50 having a flexible portion 60, a first ferrule 90, and a second ferrule 92. The flexible portion 60 includes a braided section 61 that enables the flexible bus bar section 50 to bend in any suitable direction along one or more of the longitudinal axis 26, the lateral axis 28, or the vertical axis 30, or any combination thereof. The first ferrule 90 includes a first set of slotted holes 94 that may be utilized to couple the flexible bus bar section 50 to the first rigid bus bar section. The second ferrule 92 includes a second set of slotted holes 96 that may be utilized to couple the flexible bus bar section 50 to the second rigid bus bar section. Further, the first ferrule 90 and the second ferrule 92 may also provide additional support to the flexible portion 60. For example, the ferrules 90, 92 may surround end portions of the flexible portion 60 to provide support to the braided section 61 of the flexible portion 60. In some embodiments, each of the slotted holes 94, 96 may receive a fastener (e.g., a bolt, screw, etc.) to couple the flexible bus bar section 50 to a rigid bus bar section.

In the present embodiment, the first set of slotted holes 94 of the first ferrule 90 includes two slotted holes that are offset and parallel to one another, and the second set of slotted holes 96 includes two slotted holes that are longitudinally aligned with one another. The slotted holes of the first set of slotted holes 94 and the second set of slotted holes 96 may facilitate coupling the flexible bus bar 50 to corresponding rigid bus bars. In some embodiments, the first set of slotted holes 94 may include more or fewer slotted holes, such as 1, 2, 3, 4, 5, 6, or more slotted holes. In some embodiments, the second set of slotted holes 96 may include more or fewer slotted holes, such as 1, 2, 3, 4, 5, 6, or more slotted holes. Further, in some embodiments, the quantity of slotted holes in the first set of slotted holes 94 and the quantity of slotted holes in the second set of slotted holes 96 may be the same as each other, or may be different from one another.

The slotted holes of the first set of slotted holes 94 and of the second set of slotted holes 96 may be disposed along a longitudinal axis 98 that bisects the flexible bus bar section 50. In some embodiments, the slotted holes of the first set of slotted holes 94 or the slotted holes of the second set of slotted holes 96 may be disposed at any suitable location on the respective ferrules 90, 92. For example, the slotted holes of the first set of slotted holes 94 may be arranged along a first axis 97 that is transverse (e.g., perpendicular) to the longitudinal axis 98, and the slotted holes of the second set of slotted holes 96 may be arranged along a second axis 99 that is transverse (e.g., oblique) to the longitudinal axis 98.

This written description uses examples to disclose the subject matter, including the best mode, and also to enable any person skilled in the art to practice the subject matter, including making and using any devices or systems and performing any incorporated methods. The patentable scope of the subject matter is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f). This written description uses examples to disclose the subject matter, including the best mode, and also to enable any person skilled in the art to practice the subject matter, including making and using any devices or systems and performing any incorporated methods. The patentable scope of the subject matter is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system, comprising:
   a bus duct comprising a first end, a second end, and a duct body extending between the first end and the second end, wherein the duct body comprises a flexible bus duct section, and the duct body forms an interior cavity; and
   a bus bar disposed within the interior cavity of the bus duct, wherein the bus bar comprises a first rigid section, a second rigid section, and a flexible section disposed between the first rigid section and the second rigid section, wherein the flexible section of the bus bar comprises a conductive braid, wherein the flexible bus duct section and the flexible section of the bus bar are configured to translate along at least one of a longitudinal axis, a lateral axis, and a vertical axis;
wherein the bus bar is configured to transfer electricity from the first rigid section to the second rigid section, and the bus duct is configured to isolate the bus bar from an external environment.

2. The system of claim 1, wherein the bus bar comprises a first ferrule coupled between the first rigid section and the flexible section via a first fastener, and the first ferrule comprises a first slotted hole disposed along a first axis of the first ferrule, wherein the first fastener is configured to translate within the first slotted hole when the flexible section of the bus bar translates along the longitudinal axis.

3. The system of claim 2, wherein the bus bar comprises a second ferrule coupled between the second rigid section and the flexible section via a second fastener, and the second ferrule comprises a second slotted hole disposed along a second axis of the second ferrule, wherein the second fastener is configured to translate within the second slotted hole when the flexible section of the bus bar translates along the longitudinal axis.

4. The system of claim 2, wherein the first ferrule comprises a plurality of slotted holes, and each slotted hole of the plurality of slotted holes is disposed along a respective axis parallel to the first axis of the first ferrule.

5. The system of claim 1, wherein the external environment comprises a corrosive environment, and the bus duct complies with an IEC60079-15 standard.

6. The system of claim 1, comprising:
a generator coupled to the first end of the bus duct; and
a circuit breaker system coupled to the second end of the bus duct, wherein the bus bar is configured to transfer electricity from the generator to the circuit breaker system.

7. The system of claim 6, comprising:
a mobile platform, wherein the generator, the bus duct, the bus bar, and the circuit breaker are disposed on the mobile platform, and the mobile platform is configured to be pulled by a vehicle.

8. The system of claim 1, wherein the conductive braid comprises a copper braid.

9. The system of claim 1, wherein the flexible bus duct section is configured to translate to dispose the second end a first distance from the first end, and the flexible bus duct section is configured to translate to dispose the second end a second distance from the first end, wherein the first distance is different than the second distance.

10. The system of claim 1, wherein the flexible bus duct section is configured to translate to dispose the second end at a first position along a connection axis, and the flexible bus duct section is configured to translate to dispose the second end at a second position offset from the connection axis.

11. A system comprising:
a bus duct comprising a first end, a second end, and a duct body extending between the first end and the second end, wherein the duct body comprises a flexible bus duct section, and the duct body forms an interior cavity; and
a plurality of bus bars disposed within the interior cavity of the bus duct, wherein each of the plurality of bus bars comprises a first rigid section, a second rigid section, and a flexible section disposed between the first rigid section and the second rigid section, wherein the flexible section of each of the plurality of bus bars comprises a conductive braid, wherein the flexible bus duct section and the flexible section of each of the plurality of bus bars are configured to translate along at least one of a longitudinal axis, a lateral axis, and a vertical axis;
wherein each of the plurality of bus bars is configured to transfer electricity from the first rigid section to the second rigid section, and the bus duct is configured to isolate the plurality of bus bars from an external environment.

12. The system of claim 11, wherein each bus bar of the plurality of bus bars comprises a first ferrule coupled between the respective first rigid section and the respective flexible section via a respective first fastener, and each first ferrule comprises a first slotted hole disposed along a first axis of the respective first ferrule, wherein the respective first fastener is configured to translate within the first slotted hole when the respective flexible section of the respective bus bar translates along the longitudinal axis.

13. The system of claim 11, wherein each bus bar of the plurality of bus bars comprises a second ferrule coupled between the respective second rigid section and the respective flexible section via one or more respective second fasteners, and each second ferrule comprises a plurality of slotted holes, wherein the one or more respective second fasteners is configured to translate within the plurality of slotted holes when the respective flexible section of the respective bus bar translates along the longitudinal axis.

14. The system of claim 11, wherein the external environment comprises a corrosive environment, and the bus duct complies with an IEC60079-15 standard.

15. The system of claim 11, wherein the flexible bus duct section is configured to translate to dispose the second end a first distance from the first end, and the flexible bus duct section is configured to translate to dispose the second end a second distance from the first end, wherein the first distance is different than the second distance.

16. The system of claim 11, wherein the flexible bus duct section is configured to translate to dispose the second end at a first position along a connection axis, and the flexible bus duct section is configured to translate to dispose the second end at a second position offset from the connection axis.

17. The system of claim 11, comprising:
a generator coupled to the first end of the bus duct; and
a circuit breaker system coupled to the second end of the bus duct, wherein the bus bar is configured to transfer electricity from the generator to the circuit breaker system.

18. A system, comprising:
a bus duct comprising a first end, a second end, and a duct body extending between the first end and the second end, wherein the duct body comprises a flexible bus duct section, and the duct body forms an interior cavity, wherein the flexible bus duct section is configured to translate to dispose the second end at a first position along a connection axis a first distance from the first end, and the flexible bus duct section is configured to translate to dispose the second end at a second position a second distance from the first end, wherein the first distance is different than the second distance, and the second position is offset from the connection axis;
at least one bus bar disposed within the interior cavity of the bus duct, wherein the at least one bus bar comprises a first rigid section, a second rigid section, and a flexible section disposed between the first rigid section and the second rigid section, wherein the flexible section of the at least one bus bar comprises a conductive braid, wherein the flexible bus duct section and the flexible section of the at least one bus bar are configured to translate along at least one of a longitudinal axis, a lateral axis, and a vertical axis;

wherein the at least one bus bar is configured to transfer electricity from the first rigid section to the second rigid section, and the bus duct is configured to isolate the at least one bus bar from an external environment;

a generator coupled to the first end of the bus duct; and a circuit breaker system coupled to the second end of the bus duct, wherein the at least one bus bar is configured to transfer electricity from the generator to the circuit breaker system.

19. The system of claim 18, wherein the at least one bus bar comprises a plurality of bus bars contained within the interior cavity.

20. The system of claim 19, comprising a mobile platform, wherein the generator, the bus duct, the plurality of bus bars, and the circuit breaker are disposed on the mobile platform, and the mobile platform is configured to be pulled by a vehicle.

\* \* \* \* \*